United States Patent Office 3,386,537
Patented June 4, 1968

3,386,537
BRAKING CONTROL APPARATUS
Mamoru Watanabe, Tokyo, Japan, assignor to
Toyoju Mochizuki, Tokyo, Japan
Filed May 31, 1966, Ser. No. 554,095
Claims priority, application Japan, June 2, 1965,
40/32,192
6 Claims. (Cl. 188—181)

ABSTRACT OF THE DISCLOSURE

Brake mechanism is provided in which braking action provided by at least one shoe is dependent on rotation of drum, which if it stops rotating due to skidding or the like, releases the shoe due to control of a cam operated hydraulic system by drum rotation.

---

This invention relates to a brake control apparatus that is operated by fluid pressure.

An object of this invention is to provide a mechanism designed to regulate fluid pressure supplied to pressure exerting mechanisms mounted on fixed body parts in response to the motion of rotating parts.

This brake control apparatus, if it is installed on a vehicle, enables the operator to ease the brake lock at the time of braking without his having to regulate the brake fluid pressure and thus prevents skidding on the road. Further, it enables him to obtain braking balance at the time of a load or no load.

A detailed explanation is next made of the structure of this invention with the aid of the attached drawing in which.

Figure 1:
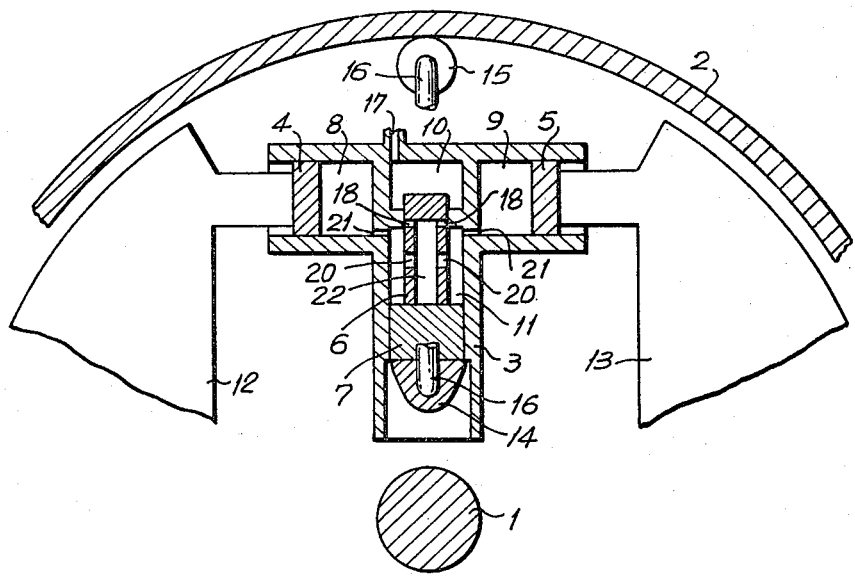
FIG. 1 is a cross section of an embodiment of this invention.
Figure 2:
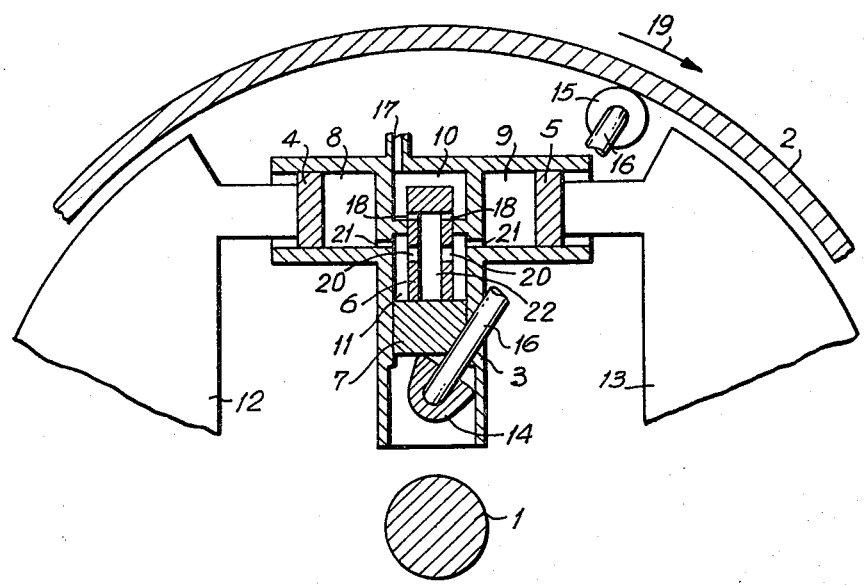
FIG. 2 shows the structure illustrated in FIG. 1 in a different condition.
Figure 3:
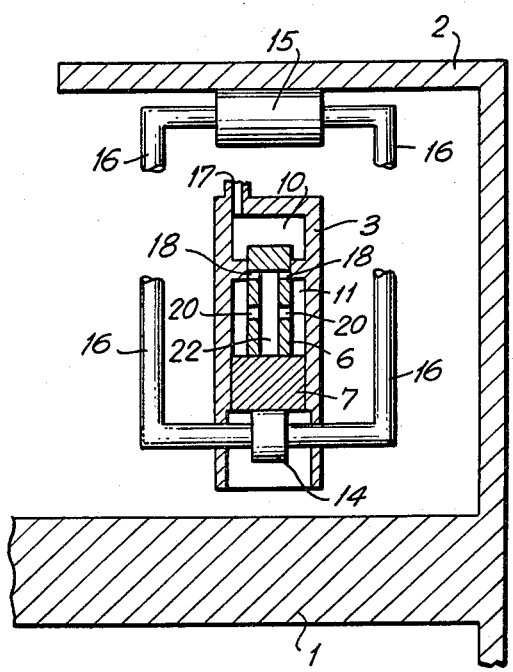
FIG. 3 is a cross section of the structure of FIG. 1 from another angle.

In FIGS. 1–3 the driving force of a power source is transmitted to the shaft 1 and the drum 2. The fluid pressure cylinder 3 mounted on the fixed body part consists of fluid pressure chambers 8, 9, 10 and 11, pressure pistons 4 and 5, a plunger 6 and a fluid pressure regulating piston 7. The pressure exerting mechanisms 12 and 13 are connected so as to operate by the pressure pistons 4 and 5. The plunger 6 and the fluid pressure regulating piston 7 are connected so as to operate by a cam 14 which is connected so as to operate by a lever 16 provided on the other end with a contact unit 15 that contacts the drum 2.

In FIGS. 1 and 3, the shaft 1 and the drum 2 are in stop condition, and each mechanism is in stop condition at its non-operating position. Each of the fluid pressure chambers 8, 9, 10 and 11 is filled beforehand with a fluid pressure; and in this condition if the fluid pressure is transmitted from the fluid pressure generator through the fluid pressure passage port 17, it does not reach the fluid pressure chambers 8, 9 and 11 because this transmission circuit is closed due to the fact the port 18 of the plunger 6 is at a cut-off position relative to the fluid pressure chamber 10.

In FIG. 2, the shaft 1 and the drum 2 have been rotated by a driving force in the direction indicated by the arrow 19. In this condition the lever 16 is given its non-operating position by an elastic body. The contact unit 15, because it is pressed against the drum 2 by an elastic body, moves as far right with the drum 2 rotation as its angle range permits. At this time the lever 16 acts on the cam 14 which causes the fluid pressure regulating piston 7 and the plunger 6 to move until the port 18 is exposed in the fluid pressure regulating chamber 10. In the condition illustrated in FIG. 2, the port 18 of the plunger 6 communicates the fluid pressure chamber 10 with the fluid pressure chamber 22 located in the plunger 6, the communicating port 20 communicates the fluid pressure chamber 22 in the plunger 6 with the fluid pressure chamber 11 and the communicating port 21 communicates the fluid pressure chamber 11 with each of the other fluid pressure chambers 8 and 9. This brake control mechanism is, therefore, in condition for the pressure exerting mechanisms 12 and 13 to press against the drum 2 if a fluid pressure is transmitted from the fluid pressure passage port 17 as a result of the action of the operator.

In the condition shown in FIG. 2, if a fluid pressure is applied, as a result of the action of the operator, through the fluid pressure passage port 17, it is transmitted to all the fluid pressure chambers 8, 9, 10 and 11 as well as to the fluid pressure chamber 22 in the plunger 6 and the pressure pistons 4 and 5 force the pressure exerting mechanisms 12 and 13 to exert pressure on the drum 2, thereby braking the driving force or the shaft 1.

This process can be continued until the drum 2 ceases its rotation. When the drum 2 ceases to rotate, the contact unit 15 provided on the lever loses its power to move and the lever 16, the cam 14, the fluid pressure regulating piston 7 and the plunger 6 return to their positions as indicated in FIGS. 1 and 3 by the return force given beforehand to the lever 16 by an elastic body. At this time since the fluid pressure regulating piston 7 and the plunger 6 recede to their respective non-operating positions due to the change of position of the cam 14, the port 18 closes off the fluid pressure transmitted from the fluid pressure chamber 10 and, at the same time the displacement of the fluid pressure chamber 11 increases.

In the above process the pressure decreases in the fluid pressure chambers 8, 9, 11 and 22 connected by the communicating ports 21 and 20. Since the fluid pressure is not transmitted continuously from the fluid pressure chamber 10, the pressure on the pressure exerting mechanisms 12 and 13 is eased until the next rotation of the drum 2. This action occurs also when the drum 2 rotates in the direction opposite to that indicated by the arrow 19.

These mechanisms and their actions meet the object of this invention; that is, they regulate the fluid pressure fed to the pressure exerting mechanisms mounted on the fixed body part in response to the motion of the rotating part.

Figure 4:
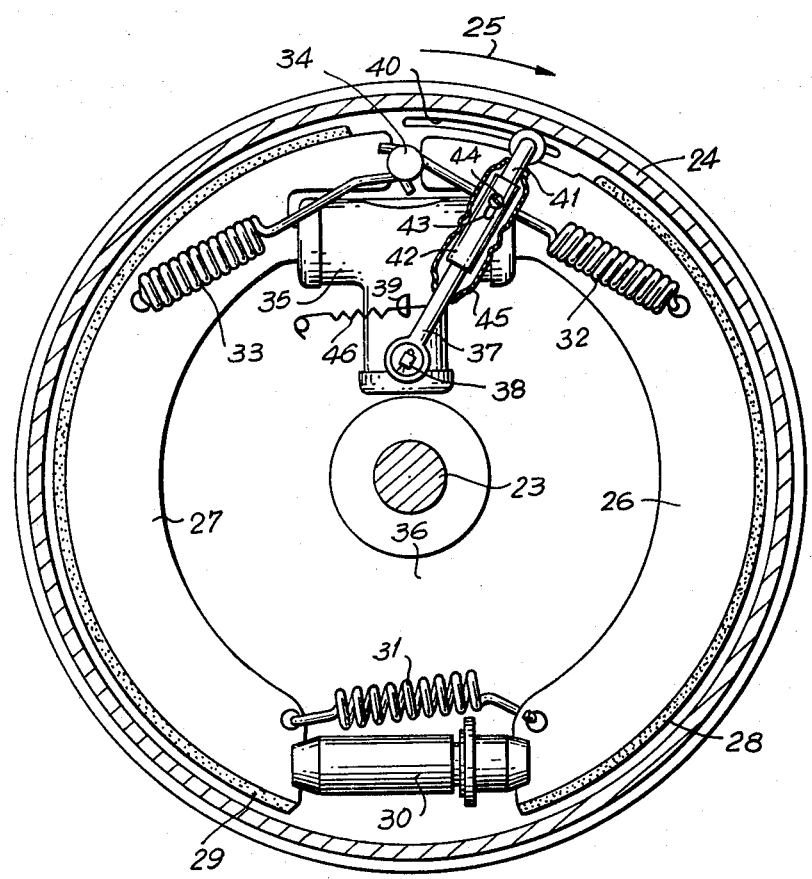
FIG. 4 shows another embodiment of this invention.
Figure 5:
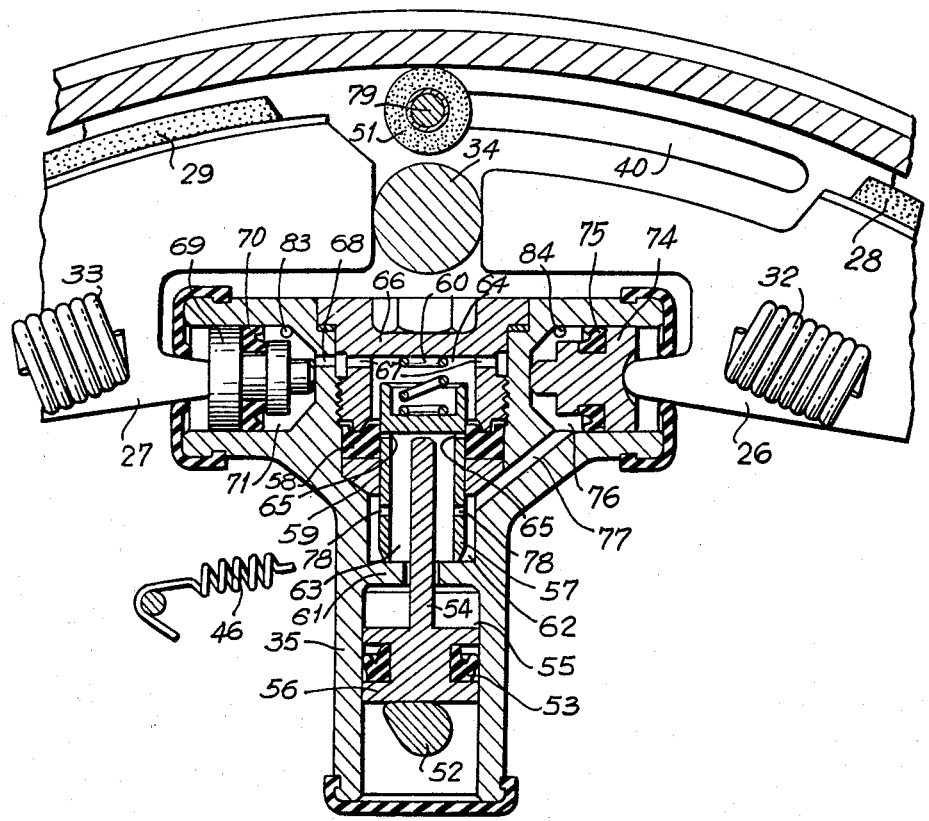
FIG. 5 and FIG. 6 are partial cross-sectional views of the structure of FIG. 4.
Figure 5:
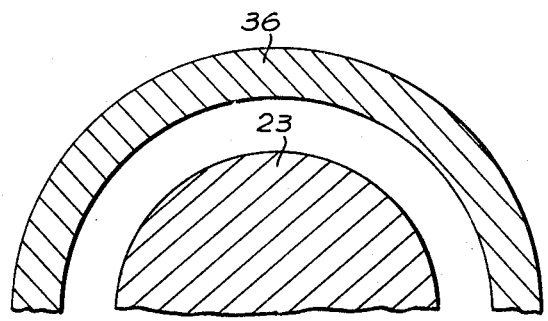
Figure 6:
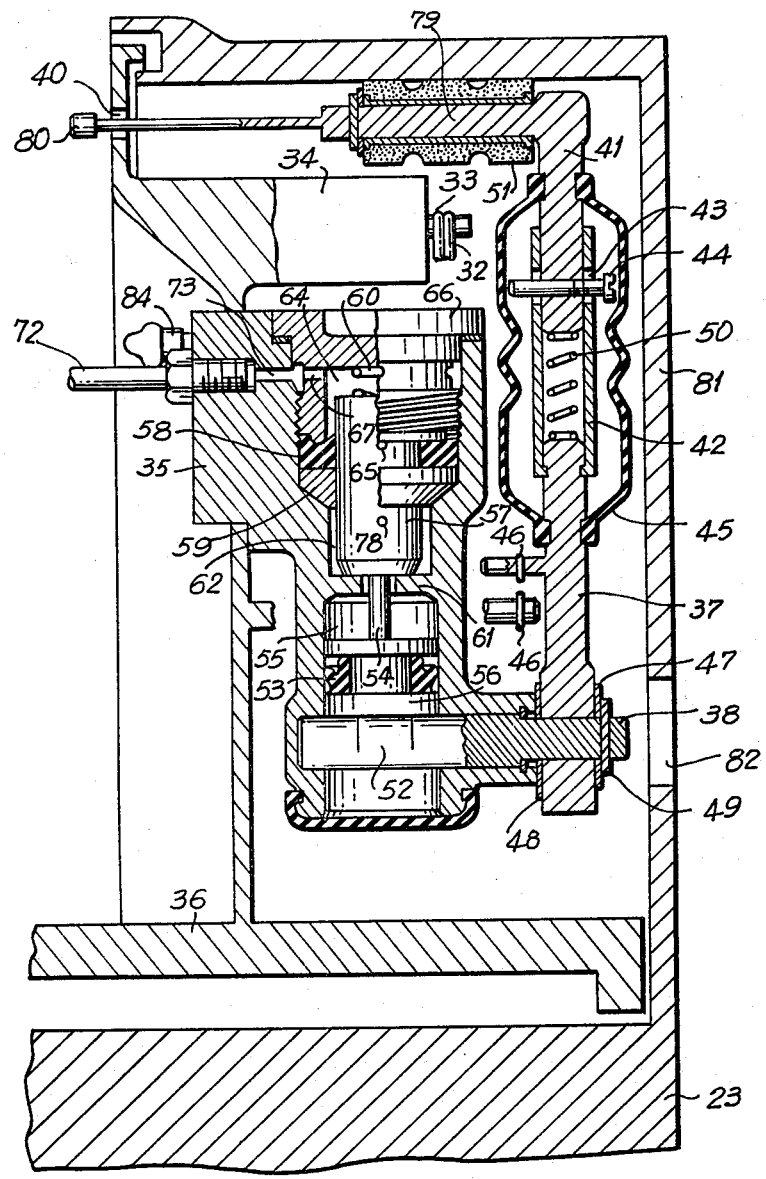

FIG. 4 illustrates an example of this brake control mechanism fitted on a motor vehicle. FIG. 5 is a partial cross section of FIG. 4 and FIG. 6 shows a cross section of FIG. 5 from a different angle.

In FIG. 4 the rotating motion of the shaft 23 is transmitted to the drum 24 which rotates in the direction of the arrow 25 to move the vehicle forward. The primary and secondary brake shoes 26 and 27 are connected at one end by the brake adjusting device 30 to adjust the clearance between the brake linings 28 and 29 and the drum and are also connected by a spring 31. They release the braking action on the drum 24 by having their other ends press toward the anchor 34 by the action of the return springs 32 and 33.

The fluid pressure cylinder 35 is mounted on the fixed body part 36. The levers 37 and 41 move to the right as the drum rotates and leave the stud 39 which gives their non-operating positions and gives the camshaft its angle of operation.

The angle of operation centered around the camshaft 38 of the levers 37 and 41 is limited partly by the slot hole 40 in the fixed body part 36, and more positively by the fact that the slot hole 43 in the connecting tube 42 fitted between the lever 37 and the lever 41 and the pin 44 fixed to the lever 41 through this slot hole check the maximum length of the levers 37 and 41. The part where the levers 37 and 41 are connected by the connecting tube 42 and the pin 44 has a dustproof cover 45. The levers 37 and 41 having the above-described structure move around the camshaft 38 in response to the rotation of the drum 24. When the drum 24 stops, the levers 37 and 41 return due to the force of the spring 46 to their non-operating positions set by the stud 39.

FIGS. 5 and 6 show the detailed structure of the fluid pressure cylinder 35 and levers 37 and 41.

The lever 37 is connected at one end to the camshaft 38 by means of washers 47 and 48 and a pin 49. Its other end is fastened with the connecting tube 42 which is connected to the other lever 41. One end of the lever 41 is inserted into the connecting tube 42 which contains a spring 50. To that part is fastened the pin 44 through the slot hole 43 of the connecting tube 42. On the other end of this lever 41 is a roller 51 used as a contact unit with the drum 24.

The camshaft 38 connected so as to operate by the lever 37 has a cam 52 which contacts the fluid pressure regulating piston 56 whose fluid pressure chamber 55 consists of a piston cup 58 and a plunger pusher 54. The plunger 57 is encircled by the cup 58 and the guide 59 and stops due to action of the spring 60 against the shoulder 61 of the fluid pressure cylinder 35 comprising fluid pressure chambers 62, 63 and 64. In this case, the circuit for transmitting the fluid pressure from the fluid pressure chamber 64 to the other fluid pressure chamber 63 is closed because the port 65 is at a cut-off position relative to the fluid pressure chamber 64. However, because the head plug 66 which makes up the fluid pressure chamber 64 with the plunger 57 has a communicating port 67 and the fluid pressure cylinder 35 has a corresponding communicating port 68, the fluid pressure chamber 71 consisting of a pressure piston 69 and a cup 70 communicates with the fluid pressure chamber 64 at all times and, if a fluid pressure is transmitted from the tube 72 and the fluid pressure passage port 73, it is always possible for the pressure piston 69 to exert pressure on the secondary brake shoe 27. The primary brake shoe 26 which is caused by the pressure piston 74 to exert pressure cannot receive the fluid pressure transmitted from the fluid pressure generator through the tube 72, the passage port 73 and the fluid pressure chamber 64 unless the port 65 is exposed in the fluid pressure chamber 64 due to the action of the plunger 57, even if the fluid pressure chamber 76 consisting of the pressure piston 74 and a cup 75 communicates with the other fluid pressure chamber 62 through a communicating port 77.

In FIGS. 5 and 6, the shaft 23 and the drum 24 are in stop condition and the brake is released and various mechanisms are at their designated non-operating positions. If the shaft 23 and the drum 24 rotate to the right, namely, in the direction of the arrow 25 as indicated in FIG. 4, the vehicle moves forward. In this case, the spring 50 presses the lever 41 and the roller 51 against the contact surface of the drum 24, and the pin 44 fixed to the lever 41 through the slot hole 43 of the connecting tube 42 always keeps the axis of the roller 51 parallel with that of the camshaft 38. Accordingly, the levers 37 and 41 leave the stud 39 indicated in FIG. 4 as the drum 24 rotates, and moves to the right, swinging around the camshaft 38. Because the drum rotates around the shaft 23, the levers 37 and 41 swing around the camshaft 38 and the spring 50 inserted between the levers 37 and 41 acts to push the lever 41 toward the outside. The movement of the levers 37 and 41 will continue so long as this action continues. In this mechanism therefore the amount by which the lever 41 extends toward the outside, namely, the maximum length of the combined levers 37 and 41 is checked by limiting the length of the slot hole 43 in the connecting tube 42 in the direction of the axis of the connecting tube 42 and by prescribing the range of operation of the pin 44 which moves along it. By so doing, the swinging angle is set for the levers 37 and 41 which move, swinging around the camshaft 38.

The movement of the lever 37 causes the camshaft 38 to rotate, and the cam 52 pushes up the fluid pressure regulating piston 56 which it contacts and the plunger pusher 54 of the fluid pressure regulating piston 56 causes the plunger 57 to move into the fluid pressure chamber 64. The plunger 57, if it moves to the extent of exposing its port 65 in the fluid pressure chamber 64, opens the fluid pressure transmitting circuit from the tube 72 to the fluid pressure chamber 76 by way of the fluid pressure passage port 73, the communicating port 67 of the head plug 66, the fluid pressure chamber 64, the port 65 and fluid pressure chamber 63 of the plunger 57, the communicating port 78, the fluid pressure chamber 62 and the communicating port 77.

Further, since the fluid pressure transmitting circuit is always open, under the above-described condition, namely, if the vehicle moves forward, the shaft 23 and the drum 24 rotate and the lever assembly 37, 41 moves to the right within its set range of angle, and this brake control mechanism can brake, with all its fluid pressure chambers 62, 63, 64, 71 and 76 mutually interconnected, until the drum 24 ceases rotating.

If, by the operator's intent of brake controlling, the fluid pressure is transmitted by way of the tube 72 and the fluid pressure passage port 73, the pressure pistons 69 and 74 press their respective brake shoes 26 and 27 and brake linings 28 and 29 against the drum 24. At this time, the fluid pressure regulating piston 56 also presses the cam 52. But the balance of force on the camshaft 38 due to the ratio between the distance from the axis of the camshaft 38 to the point where the cam acts on the fluid pressure regulating piston 56 and the distance to the point where it acts on the drum 24, namely the length of the lever assembly 37, 41 prevents the camshaft 38 from rotating and the fluid pressure regulating piston 56 from receding due to the force of the fluid pressure.

When the primary and secondary brake shoes 26 and 27 and the brake linings 28 and 29 are pressed against the drum 24 by the pressure pistons 69 and 74, the primary brake shoe 26 leaves the anchor 34 due to the rotating force of the drum 24 as indicated by arrow 25 in FIG. 4 to exert pressure on the drum 24, and this force is transmitted to the secondary brake shoe 27 through the brake adjusting device 30. As a result, the secondary brake shoe 27 also exerts pressure on the drum 24 due to the force of reaction of the rotating force of the drum 24 on the anchor 34. Therefore, when a vehicle that is moving forward is braked, the primary brake shoe 26 operates away from the anchor 34 while the secondary brake shoe operates by pressing against the anchor.

When braking is effected by the above process and the rotation of the drum 24 is brought to a stop, the lever assembly 37, 41 returns due to the force of the lever return spring 46 to its non-operating position set by the stud 39 and the camshaft 38 and the cam 52 also return to their non-operating positions. With this return action, the fluid pressure regulating piston 56 and the plunger 57 recede, the port 65 shuts off the connecting circuit between the fluid pressure chamber 64 and the other fluid pressure chamber 63 and the displacement of the fluid pressure chamber 55 increases. Therefore, pressure decreases in the fluid pressure chambers 63, 62 and 76 which are connected to the fluid pressure chamber 55. As a result, the pressure of the pressure piston 74, the primary brake shoe 26 and the brake lining 28 against the drum 24 is eased and the primary brake shoe 26 tends to return toward the anchor 34 due to the action of its return spring 32. The braking force of the entire brake control mechanism is thus eased.

For this reason the operator can, in this braking process, supply fluid pressure continuously until the drum 24 ceases rotation and can effect brake control with the purpose of slowing down or stopping the vehicle. If the drum ceases rotation but the vehicle cannot be brought to a halt, namely, if the efficiency of braking between road surface and the vehicle is reduced by brake lock to cause skidding or if braking efficiency changes through the change of load distribution under load and no-load conditions and individual brakes develop brake lock, individual brakes, reacting to this phenomenon, ease their braking and brake lock. It is, therefore, always possible to brake with the maximum braking efficiency of the vehicle and, accordingly, there is no fear of losing vehicular balance at the time of braking.

The fact that in this fluid pressure cylinder 35, the secondary brake shoe 27, unlike the primary brake shoe 26 as described above, is in operable condition at all times means that at least some of the entire braking force is always available for continued halt or for rearward motion of the vehicle.

The lever assembly 37, 41 which works on the cam 52 can be hand-operated by a hand-operating knob 80 to be installed on the extension of the roller shaft 79 or the care-and-maintenance port to be provided on the drum side 81. Therefore, the lever assembly 37, 41 can be operated either by drum rotation or by hand. It is possible to connect all fluid pressure chambers 55, 62, 63, 64, 71 and 76 and fill them with a fluid after bleeding the air from them by bleeding valves 83 and 84.

What is claimed is:

1. A brake system comprising a rotatable drum, braking means, a pressure fluid means coupled to said braking means for applying the latter to said drum to brake rotation of the drum, and control means frictionally driven by the drum and coupled to the pressure fluid means to permit the latter to apply the braking means to the drum while the latter is rotating but preventing the pressure fluid means from applying the braking means to the drum when the drum is not rotating, the pressure fluid means including a control piston and said control means including a cam controlling said piston, a lever coupled to the cam for rotating the same, and friction means on said lever frictionally engaging said drum, said pressure fluid means further including means defining a chamber accommodating said piston, the latter said means and piston being provided with ports adapted for communication with said braking means to apply a pressure fluid to the latter, said control means including a spring urging said lever and thereby said cam to a position whereat said piston is located to cut off at least one said port to prevent the application of said pressure fluid to said braking means, engagement between the drum and friction means being sufficient to overcome the force of the latter said spring to displace the piston to provide a complete passage through all of said ports.

2. A system as claimed in claim 1 comprising a further braking means operated by said pressure fluid means independently of said control means.

3. A system as claimed in claim 1, wherein said lever includes two sections and a spring between said sections to urge the friction means into engagement with said drum, said control means further including stop means to limit movement of said lever.

4. A system as claimed in claim 1, wherein the cam has a profile providing a leverage which is less than that of said lever on the cam.

5. A system as claimed in claim 1, wherein the braking means includes two braking cylinders and pistons therein, and brake shoes operated by the latter said pistons, one of said cylinders being directly coupled to said chamber and the other being coupled to said chamber via said ports.

6. A system as claimed in claim 5, wherein the braking means further includes a stop, one of said shoes pivoting against said stop and the other being displaceable therefrom, springs urging the shoes against the latter said stop, and means connecting the shoes.

References Cited

UNITED STATES PATENTS

| 1,988,986 | 1/1935 | Sterns | 188—181 |
| 2,418,288 | 4/1947 | Benning | 188—181 |
| 2,827,137 | 3/1958 | Lockhead | 188—181 |
| 3,147,825 | 9/1964 | Barnes | 188—141 X |

MILTON BUCHLER, *Primary Examiner.*

G. E. A. HALVOSA, *Assistant Examiner.*